United States Patent [19]

Kalsi

[11] Patent Number: 5,476,046
[45] Date of Patent: Dec. 19, 1995

[54] MAGNETIC SUSPENSION AND GUIDANCE SYSTEM AND METHOD

[75] Inventor: Swarn S. Kalsi, Fort Salonga, N.Y.

[73] Assignee: Northrop Grumman Corporation, Los Angeles, Calif.

[21] Appl. No.: 307,356

[22] Filed: Sep. 14, 1994

[51] Int. Cl.[6] .................................................... B60L 13/00
[52] U.S. Cl. ................................................ 104/281; 104/286
[58] Field of Search .................................... 104/281, 282, 104/284, 286, 283, 290, 292; 198/805, 321; 187/289

[56] References Cited

U.S. PATENT DOCUMENTS

| | | | |
|---|---|---|---|
| 3,470,828 | 10/1969 | Powell et al. | 104/286 |
| 3,717,103 | 2/1973 | Guderjahn | 104/281 |
| 3,834,317 | 9/1974 | Miericke | 104/286 |
| 3,842,750 | 10/1974 | Miericke | 104/286 |
| 5,241,912 | 9/1993 | Oshima et al. | 104/282 |
| 5,253,592 | 10/1993 | Coffey | 104/281 |
| 5,270,593 | 12/1993 | Levi et al. | 104/282 |

FOREIGN PATENT DOCUMENTS

| | | | |
|---|---|---|---|
| 0202204 | 8/1988 | Japan | 104/281 |
| 0257404 | 10/1988 | Japan | 104/281 |
| 0193504 | 7/1990 | Japan | 104/281 |

*Primary Examiner*—Mark T. Le
*Attorney, Agent, or Firm*—Terry J. Anderson; Karl J. Hoch, Jr.

[57] ABSTRACT

A magnetic guidance and support system and method. The magnetic system comprises a core member and a central member. The core member includes an interior surface forming an interior, and also forms an opening in communications with that interior. The central member of the system includes an electrically conductive cylinder positioned in the interior of the core member, and connecting means connected to the cylinder and extending outward therefrom and through the opening in the core member. The magnetic system further comprises a multitude of electrical conductors axially extending along and annularly spaced around the core member, and an electric power supply connected to the electrical conductors to conduct an electric current through those conductors. When this current is conducted through the electric conductors, the conductors produce a magnetic quadrupole having a magnetic field for supporting the cylinders in the interior of the core member and spaced from the interior surface thereof.

20 Claims, 9 Drawing Sheets

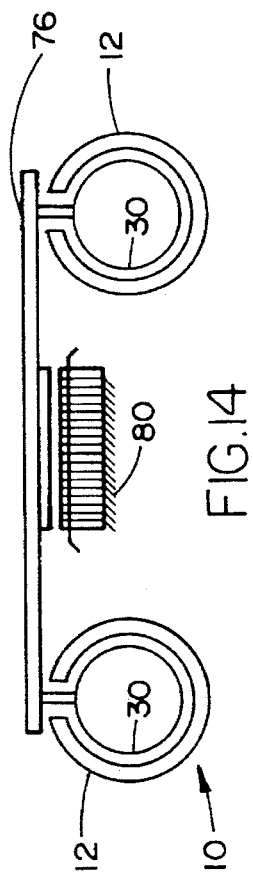
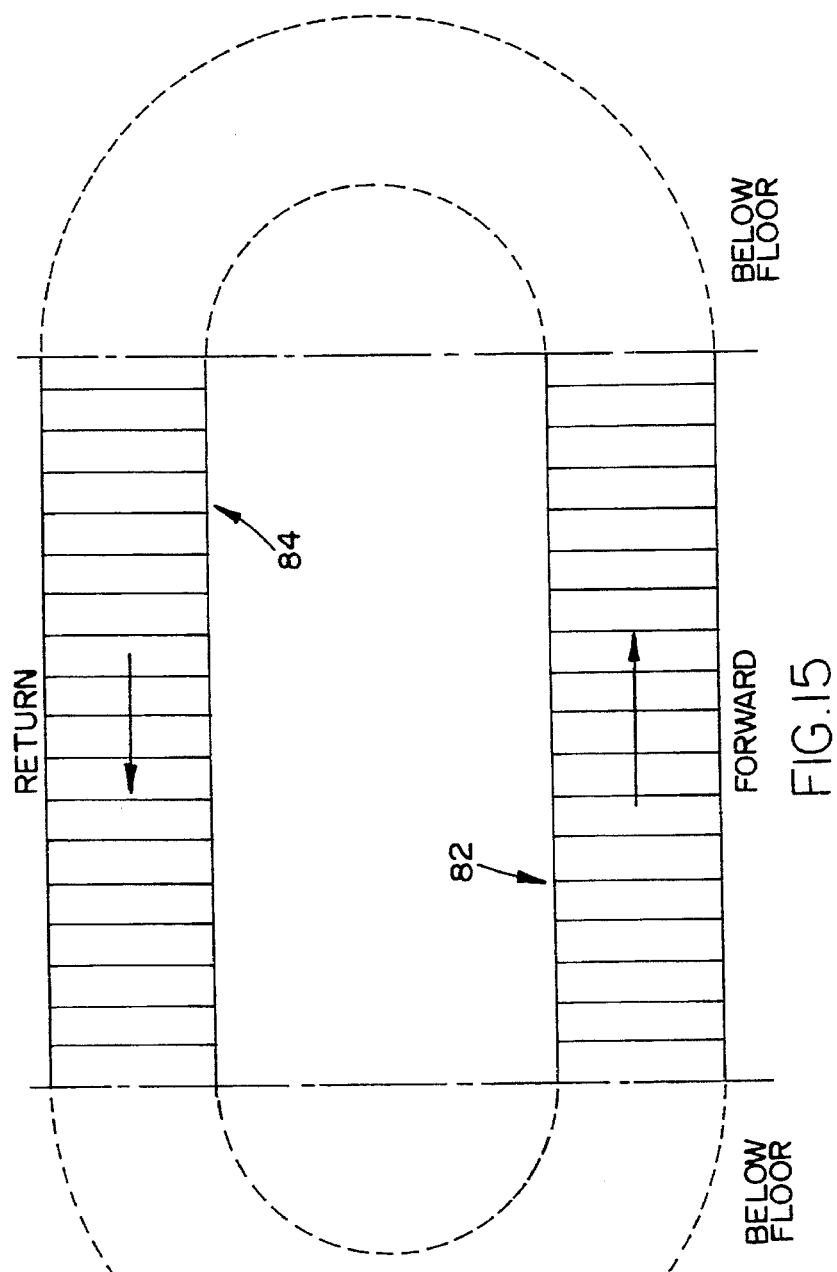

MAGNETIC SUSPENSION AND GUIDANCE SYSTEM AND METHOD

BACKGROUND OF THE INVENTION

This invention generally relates to magnetic suspension and guidance systems, and more specifically, to methods and systems that simultaneously provide magnetic suspension and guidance for moving objects.

Magnetic fields may be used to move and levitate objects, including, for example, passenger carrying vehicles.

In a typical magnetically levitated vehicle, a group of magnets mounted on the vehicle face a solid plate attached to the guideway. When the vehicle moves relative to the guideway, the vehicle magnets induce eddy-currents in the plate attached to the guideway. The interaction between the magnetic field of the vehicle magnets and the eddy-currents creates a levitating force. This levitating force is zero when the vehicle is at standstill. The levitating force increases as a function of vehicle velocity. After a limiting velocity, the levitating force stabilizes to a constant value. The vehicle may be held 2 to 4 inches above or below the guideway.

The vehicle magnets can also be utilized for propelling the vehicle by interacting with a three-phase AC winding mounted on the guideway.

Typically, additional magnets, or other suitable means, are provided to maintain the desired orientation of the vehicle. In particular, additional means may be provided to prevent the vehicle from tilting forward or rearward or to the left or right, referred to as pitch and yaw, as well as to prevent the vehicle from rolling or rotating about its longitudinal axis. With typical magnetically levitated vehicles, all of the equipment required to provide the necessary propulsion, levitation, and stabilization forces results in a comparatively complicated design and construction.

SUMMARY OF THE INVENTION

An object of this invention is to improve methods and systems for magnetically supporting articles.

A further object of the present invention is to provide a magnetic system that both levitates and guides a moving article.

Another object of this invention is to use a magnetic quadrupole to support magnetically a moving article in a stable orientation.

A further object of this invention is to incorporate magnetic means to prevent a moving article from rolling.

These and other objectives are attained with a magnetic guidance and support system and method. The magnetic system comprises a core member and a central member. The core member includes an interior surface forming an interior, and also forms an opening in communication with that interior. The central member of the system includes an electrically conductive cylinder positioned in the interior of the core member, and connecting means connected to the cylinder and extending outward therefrom and through the opening in the core member. The magnetic system further comprises a multitude of electrical conductors axially extending along and annularly spaced around the core member, and an electric power supply connected to the electrical conductors to conduct an electric current through those conductors.

When this current is conducted through the electric conductors, the conductors produce a magnetic quadrupole having a magnetic field for supporting the cylinders in the interior of the core member and spaced from the interior surface thereof. Preferably, the electrical conductors extend along an axial track, and the conductors are axially transposed to change polarity of quadrupoles on a fixed interval along the length of the track.

The levitation and guidance functions of the system are generated by interaction between the magnetic field generated by the quadrupole magnets and the eddy-currents induced in the conductive cylinder that moves, preferably at a high speed, relative to the static magnetic field. In a preferred mode, a levitated vehicle is attached to the conductive cylinder, and the quadrupole magnets are attached to a guideway. Alternatively, in some applications, a levitated vehicle may be attached to the quadrupole magnets, and the conductive cylinder may be attached to a guideway. The magnetic system disclosed herein may be employed to levitate a vehicle while providing guidance in horizontal, vertical, pitch, and yaw directions. For most applications, iron core magnets would be preferred; however, it is also possible to accomplish these functions with air core magnets.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIGS. 14 and 15 illustrate a moving sidewalk supported by a magnetic system.

DETAILED DESCRIPTION OF THE PREFERRED EMBODIMENTS

Figure 1:
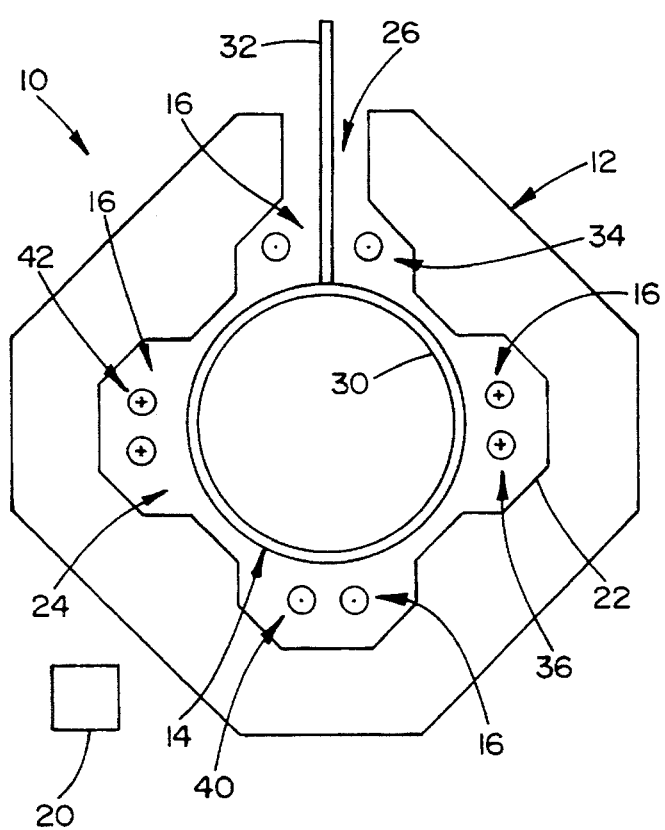
FIG. 1 illustrates a magnetic suspension and guidance system.
Figure 2:
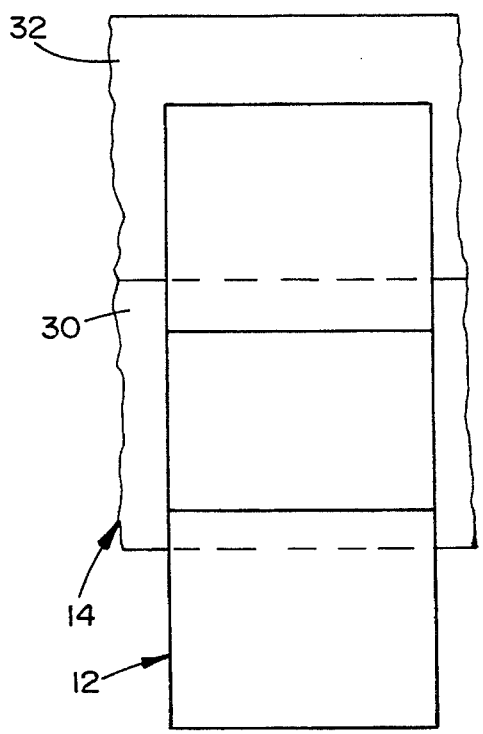
FIG. 2 is a side view of the magnetic system of FIG. 1.

FIGS. 1 and 2 illustrate magnetic support and guidance system 10 generally comprising core member 12, central member 14, electrical conductors 16, and electrical power supply 20. Generally, core member 12 has an axially extending, hollow shape and includes an interior surface 22 forming interior 24, and preferably the core member forms opening 26 that provides access to the interior of the core member from the exterior thereof. Central member 14 includes an electrically conductive cylinder 30 and connecting member 32. Cylinder 30 is positioned inside interior 24 of core member 12, and connecting member 32 is connected to the cylinder and extends outward therefrom, through opening 26. The cylinder 30 could be hollow or solid depending upon a given application.

Electrical conductors 16 include four pairs of conductors, referenced at 34, 36, 40, and 42, that axially extend along and that are annularly spaced around interior 24 of core member 12. Power supply 20 is connected to electrical conductors 16 to conduct electrical current to and through those conductors to generate a magnetic quadrupole that produces magnetic field H. With the arrangement illustrated in FIG. 1, current is conducted through conductors 34 and 40 in a first direction, and current is conducted through conductors 36 and 42 in a second, opposite direction. For example, current may be conducted through conductors 34 and 40 into the plane of FIG. 1, and current may be conducted through conductors 36 and 42 out of that plane. Currents in these conductors is reversed at predetermined intervals along the length of the guideway.

Figure 3:
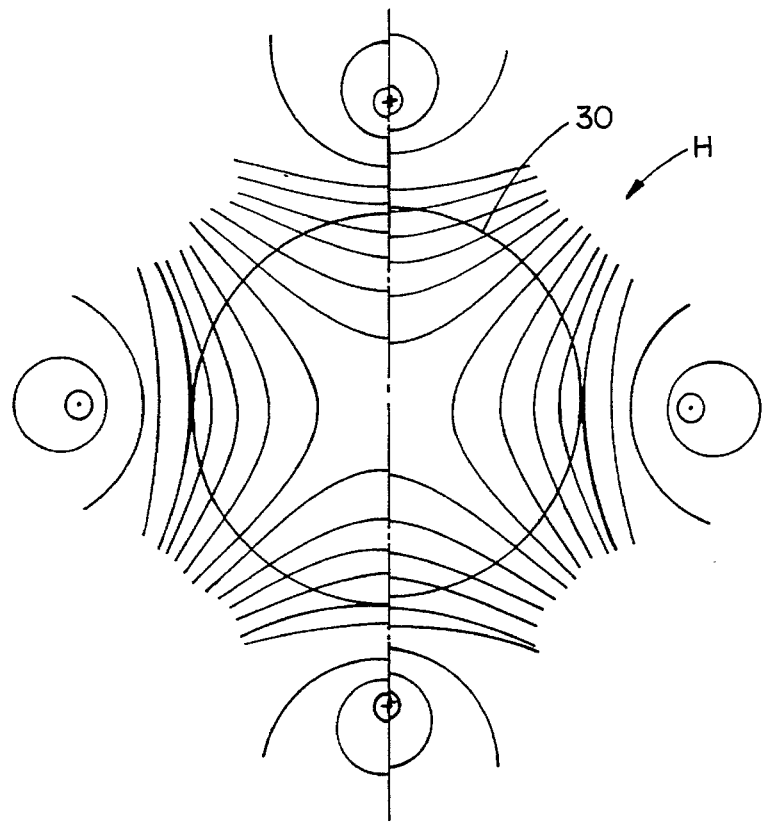
FIG. 3 shows a magnetic field that is produced in the system of FIGS. 1 and 2 when the conductive cylinder is stationary.
Figure 4:
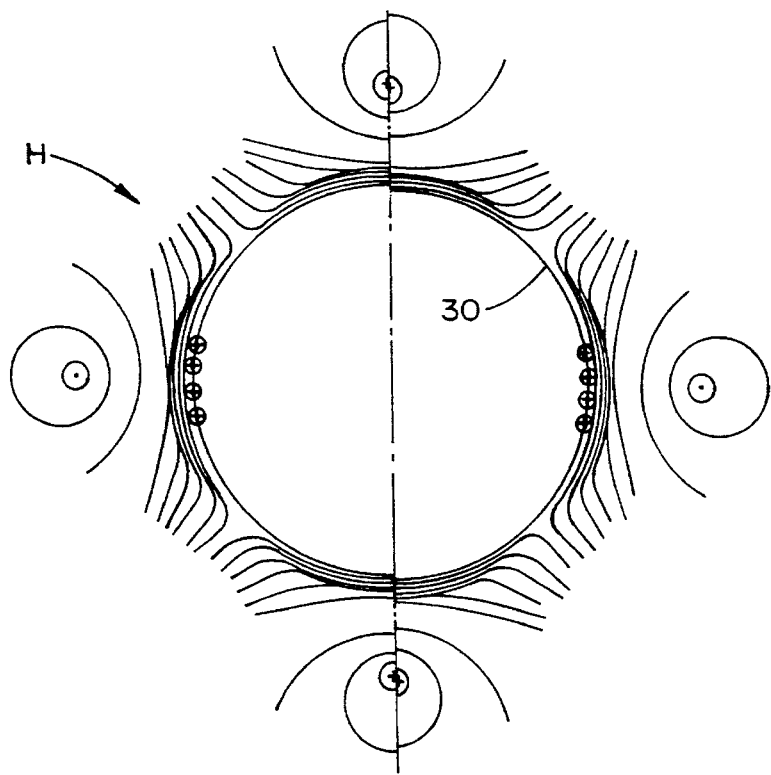
FIG. 4 illustrates a magnetic field that may be produced in the system of FIGS. 1 and 2 when there is relative movement between the conductive cylinder and a core member of the system.

As long as magnetic field H and conductive cylinder 30 are static with respect to each other, no electromagnetic interaction occurs between field H and the cylinder, and under this condition, the magnetic field fully penetrates the cylinder wall, as illustrated in FIG. 3. When member 30 moves relative to the static magnetic field H, eddy currents are induced in the cylinder wall, and these eddy currents generate an electromagnetic field that has the effect of repulsing the magnetic field of the quadrupole. When cylinder 30 is moving, the extent to which field H penetrates into the cylinder wall —or, in other words, the degree of expulsion of field H from the cylinder wall—is a function of the cylinder velocity with respect to the static magnetic field. At low cylinder velocities, only a small amount of field is expelled from the cylinder; but at very high cylinder velocities, field H is totally, or substantially totally, expelled from cylinder, as depicted in FIG. 4.

When cylinder 30 is moving through core member 12, electromagnetic forces are generated by the interaction between the magnetic field H and the eddy currents induced in the cylinder wall. Cylinder 30 experiences four sets of forces that are directed radially inward, towards the center of the cylinder, and that peak at 90° intervals around the perimeter of the cylinder. These forces keep cylinder 30 magnetically levitated in the interior of core member 12, spaced from the interior surface 22 thereof. In normal operation, these four force components have identical magnitudes and they keep cylinder 30 in equilibrium. However, if cylinder 30 deviates from its equilibrium position and tends to move towards one of the four sets of conductors, then the repulsive force between field H and cylinder 30 increases, and this tends to push the cylinder back into its equilibrium position.

This natural tendency of magnetic field H to center cylinder 30 inside core member 12 also provides pitch and yaw stabilization. To elaborate, if the front end of cylinder 30 tends to pivot to the side, about the back end of the cylinder, the magnetic forces between field H and the front end of the cylinder tend to increase, and this tends to move the cylinder back into the equilibrium position. Similarly, if the front end of cylinder 30 tends to pivot upward or downward, about the back end of the cylinder, the magnetic forces between field H and the front end of the cylinder change and tend to push the cylinder back into its equilibrium position.

Figure 5:
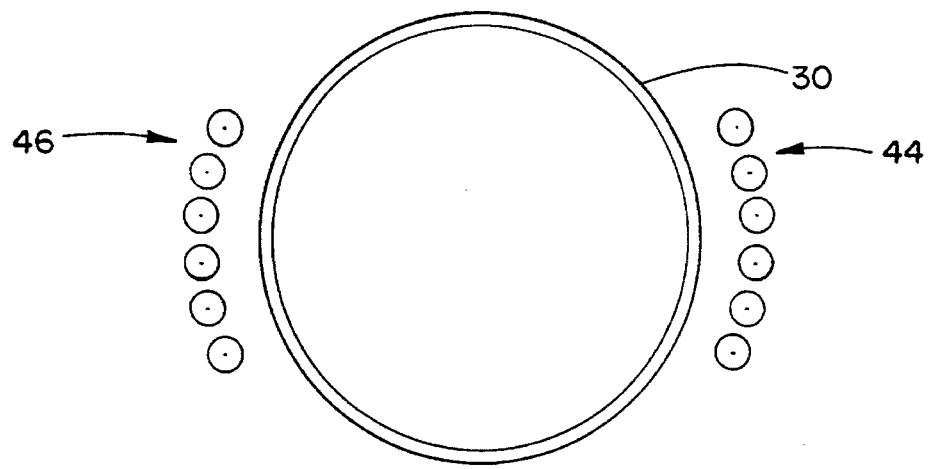
FIG. 5 depicts a scheme for roll control of the conductive cylinder that may be used in the system of FIG. 1.

Preferably, cylinder 30 is also stabilized against roll movement —that is, rolling movement about its own longitudinal axis. Some degree of roll stabilization is provided by interaction of magnetic field (produced by quadrupole) and the flange 32 in gap 26. The field is perpendicular to the flat surface of flange 32. If the flange is travelling at a fast speed with respect to the static quadrupole, then it will experience a side force (perpendicular to the plane of the flange 32) which will provide roll stabilization. It is also possible to provide roll stabilization by roll windings of FIG. 5. With reference to FIG. 5, this may be done, for example, by surrounding cylinder 30 with electrically conductive windings, referenced at 44 and 46, for conducting a three-phase alternating current. When such a current is conducted through these windings, a further magnetic field is generated that resists rotation of the cylinder about its longitudinal axis.

With the embodiment of cylinder 30 shown in FIG. 5, only about one half of the outside surface of the cylinder is covered by the roll control windings 44, 46. Preferably, a current having a fixed frequency, such as 60 hz, is constantly conducted through windings 44, 46. Also, the direction of the force of field generated by the current conducted through windings 44, 46 may be controlled in response to a signal from a roll controller (not shown). Any suitable electric coils may be used as windings 44, 46, and for example, these windings may be similar to the windings used on conventional three-phase induction motors.

Core member 12 may have many different shapes and sizes; and for example, as illustrated in FIGS. 1 and 2, the core member may have an octagonal shape, with opening 26 formed in the top of the core member. Also, core member 12 may be made from any suitable material or materials, and in particular, the core member may be made of magnetic or non-magnetic material. Preferably, though, core member 12 is made of a magnetic material.

With a preferred construction, core member 12 is comprised of iron, and four sets of quadrupole linear conductors are surrounded by magnetic iron. With this arrangement, the magnetic field in the air gap between the iron poles and the support cylinder is governed by the iron poles, and most of the magnetic field flux remains constrained in the iron. Also, conductors 16, in the iron core embodiment, experience very little forces because most of the support load —that is, any load supported by cylinder 30—is borne by the iron core. Preferably, when core member 12 is formed of iron, conductors 16 are made from conventional electrically conductive materials, such as aluminum or copper. Alternatively, an iron core quadrupole may be constructed with conductors 16 made of superconducting materials.

Figure 6:
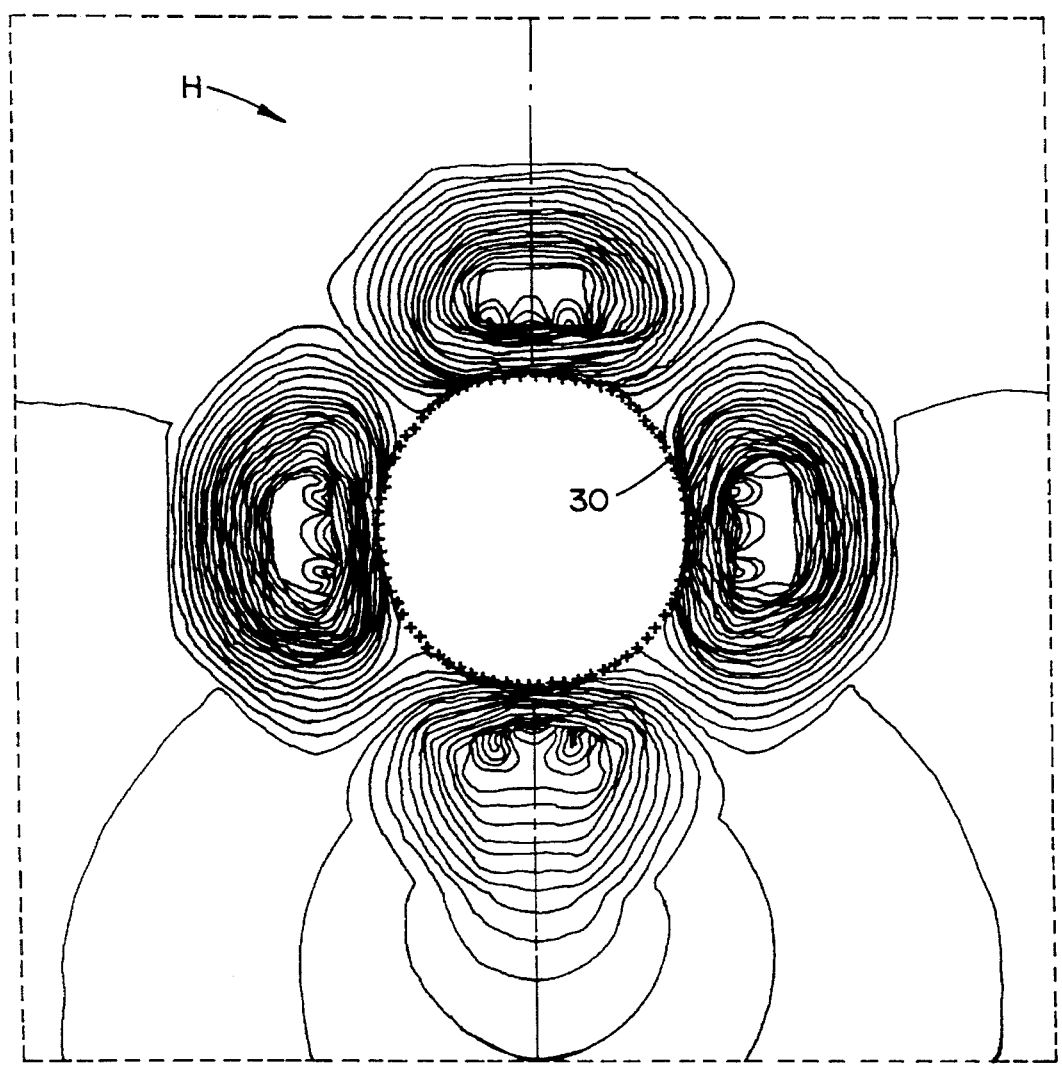
FIG. 6 shows a magnetic field that is produced in the system of FIGS. 1 and 2 when the core member is made of iron.

FIG. 6 illustrates the magnetic field H distribution when core member 12 is made of magnetic iron and, as shown therein, when most of the quadrupole field is excluded from the support cylinder 30. Also, at a distance from the support cylinder, most of the magnetic field remains contained in the iron core. When system 10 is used to support a magnetically levitated vehicle, as discussed below, the magnetic field distribution of FIG. 6 has the additional benefit of limiting the strength of the magnetic field in the passenger compartment of the field.

Figure 7:
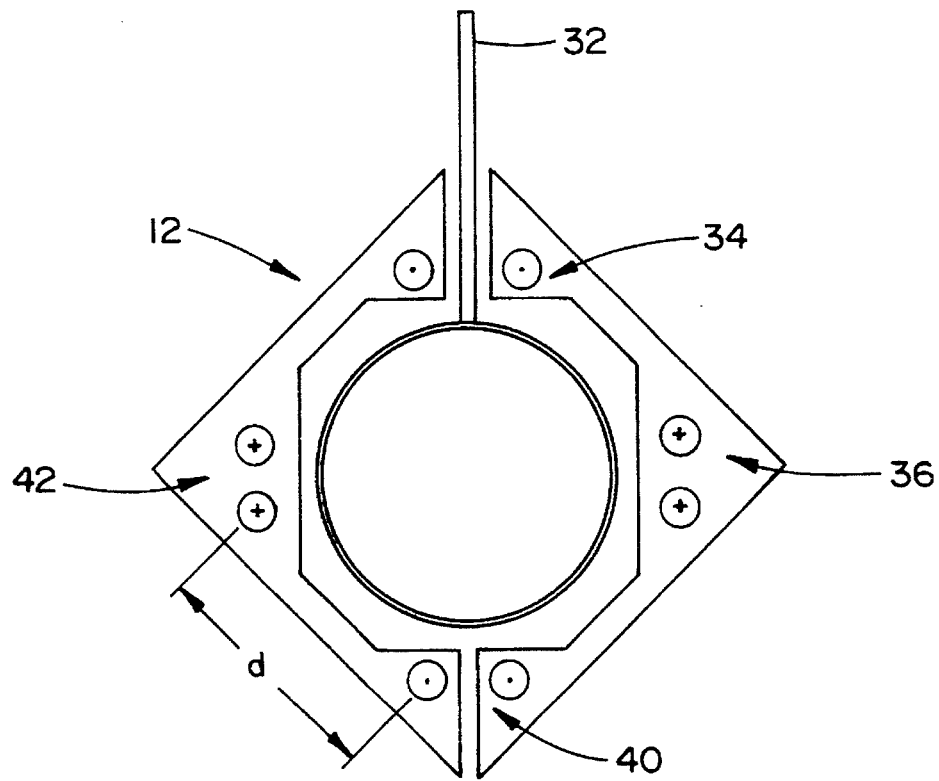
FIG. 7 shows the magnetic system with an alternate core member.

With reference to FIG. 7, the quadrupole field H may also be generated in air using four linear conductors, or four sets of linear conductors, supported by a non-metallic support. The axial length of each conductor is determined by the length of core member 12 that is energized at any one time; and this latter length, in turn, may be determined from economical and configurational considerations of a given application. An air core quadrupole field requires a larger current than an iron core quadrupole. Current in the linear conductors is reversed at a predetermined interval along the guideway to change polarity of quadrupoles.

The large current required to achieve the desired field strength, with an air core quadrupole, may generate very large magnetic forces on the conductors 16. The desired field strength may be generated in an air core quadrupole employing conventional conductors, such as aluminum or copper. However, with an air core quadrupole, it may be preferred to employ superconductors as conductors in order to minimize power losses in those conductors, and thus reduce the size or mass of the power supply required for system 10.

Figure 8:
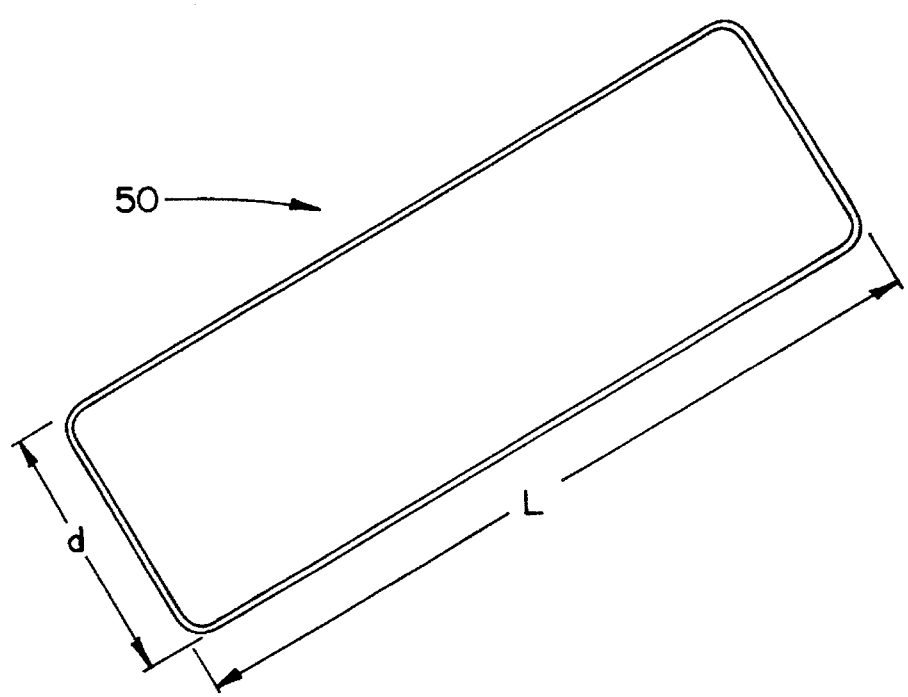
FIG. 8 illustrates an electric coil that may be used in the quadrupole magnets.

If conductors 16 are made from superconducting materials, then preferably these conductors have a coil shape of a suitable length, and FIG. 8, for example, illustrates one suitable coil shape referenced at 50. Conductors 16, whether they are conventional conductors or superconductors, may be comprised of pipes having thin walls. A given length of core member 12 may includes a multitude of individual conductor sections connected together, along that given length of the core member, and also connected to a single or common power source.

The system 10 disclosed in FIG. 1 may be easily modified to include coils of the type shown at 50 in FIG. 8. This may be done, for instance, by connecting together two adjacent conductors of FIG. 1 that carry current in opposite directions, to form a coil. The length of the coil may be determined by factors relating to the fabrication of the coil, or by factors relating to other features of system 10. For example, the width, d, of the coil is determined by the distance between two adjacent quadrupole conductors that conduct current in opposite directions. The axial length, L, of the coil may be determined by the length of the longest transportable section of core member 12, by axial pole reversal requirement, and/or by factors relating to the mechanical support of the core member.

Figure 9:
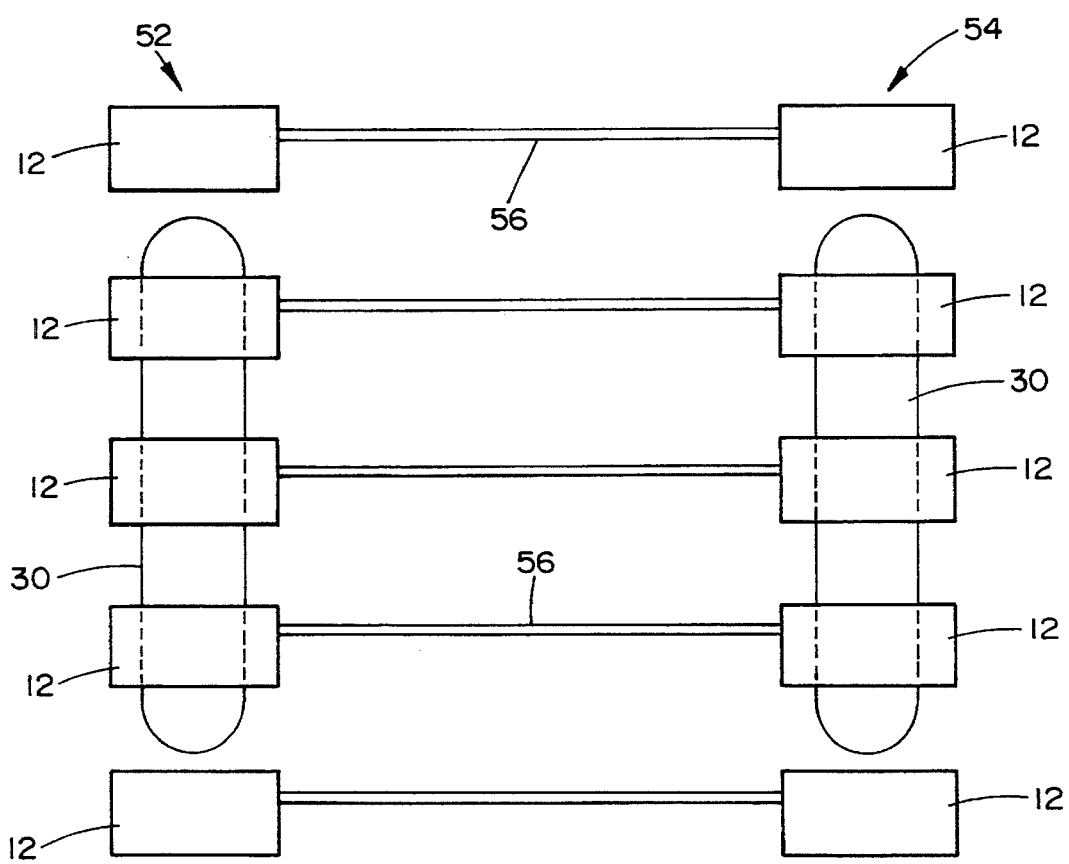
FIG. 9 shows a multitude of magnetic core members (quadrupoles) positioned in two series.

A multitude of core members 12 may be arranged in series, for example, as shown at 52 and 54 in FIG. 9, to form an elongated guideway or track. More specifically, the quadrupole magnetic tracks 52 and 54 may be constructed by positioning packs of iron core members 12 at discreet, spaced apart intervals, as illustrated in FIG. 9, in a manner similar to the way in which railroad sleepers are positioned. Iron cores 12 on two parallel tracks 52, 54 may be connected together by connecting means of the type referred to as sleepers 56, or the iron cores may be connected through a concrete guideway. Preferably, the quadrupole packs 12 are spaced apart to facilitate the discharge of air from the packs as cylinder 30 moves through the packs. This minimizes, or reduces, the air resistance experienced by cylinder 30 and any vehicle or device carried by the cylinder. When core members 12 are positioned in series, conductors 16 may each include a multitude of sections arranged along guideway and that are not electrically connected together. In this way, it is only necessary to energize the conductor sections in the portions of the guideway through which cylinder 30 is travelling. It is also possible to use coils around poles. For instance, each coil can surround one pole of an iron core pack or poles of several packs, as may be desired or required by a given design.

Figure 10:
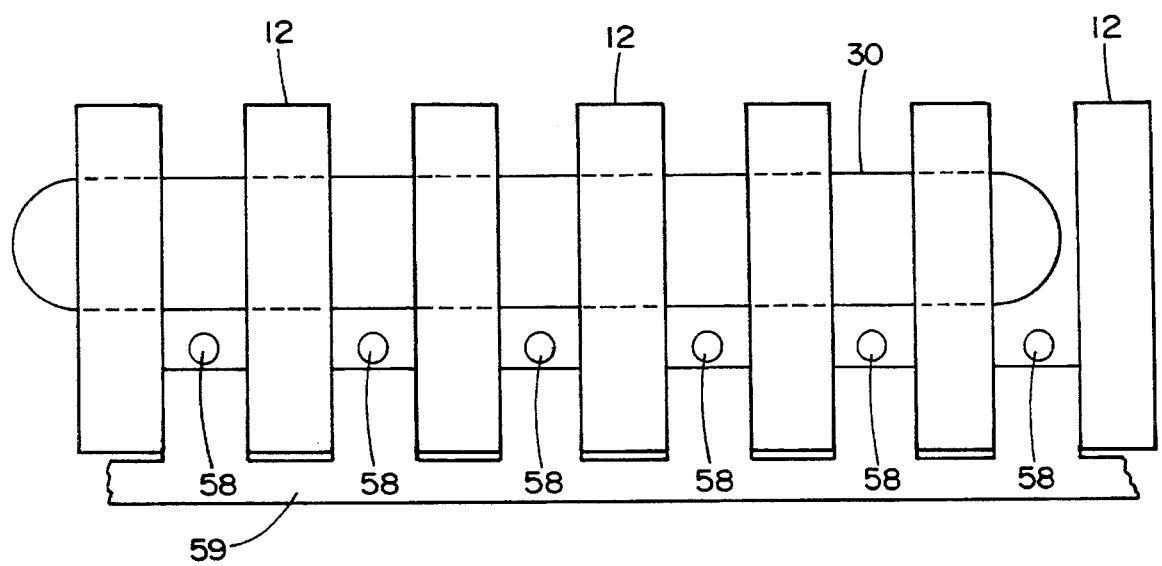
FIG. 10 shows a magnetic guideway including traction windings to propel an object along the guideway.

With reference to FIG. 10, a part of the space between iron packs 12 may also be used for installing means 58, such as a three-phase windings, to produce a tractive force on cylinder 30 that is used to propel the cylinder forward. More specifically, three-phase windings 58 may be held near iron core 59, which carries the traction winding flux. During operation, only a small section of the traction winding is energized at a time, and the frequency of the current conducted through those windings 58 may be selected to satisfy the requirements imposed by the moving cylinder 30.

Figure 11:
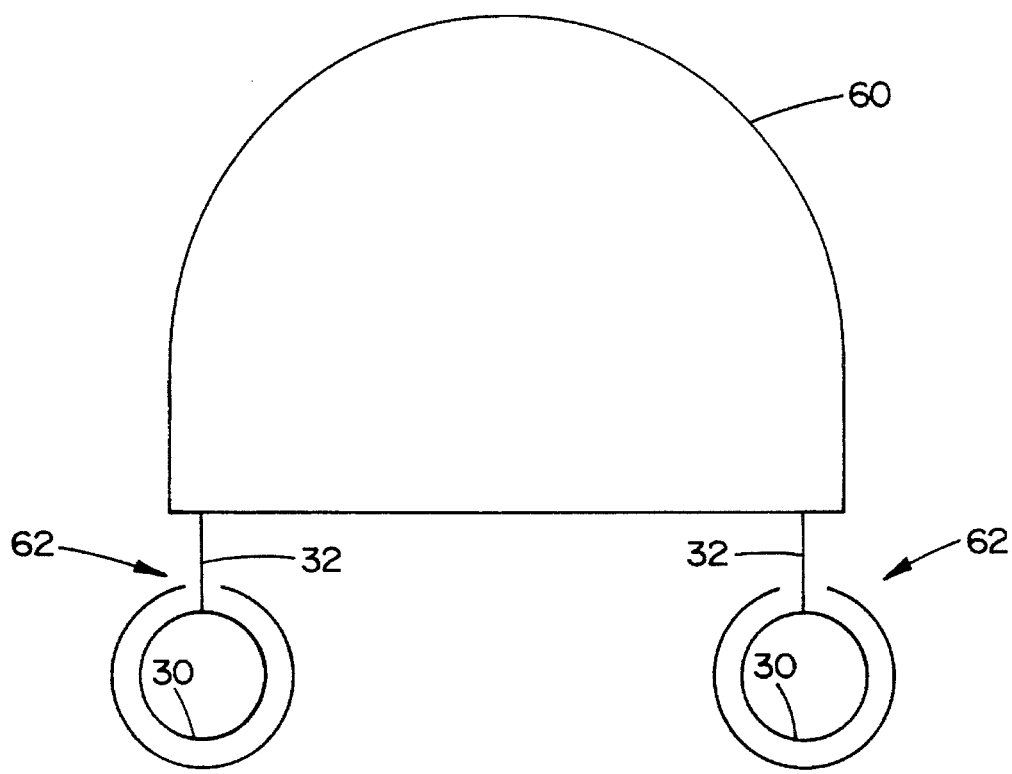
FIGS. 11 and 12 schematically illustrate a vehicle levitated by a magnetic system.
Figure 12:
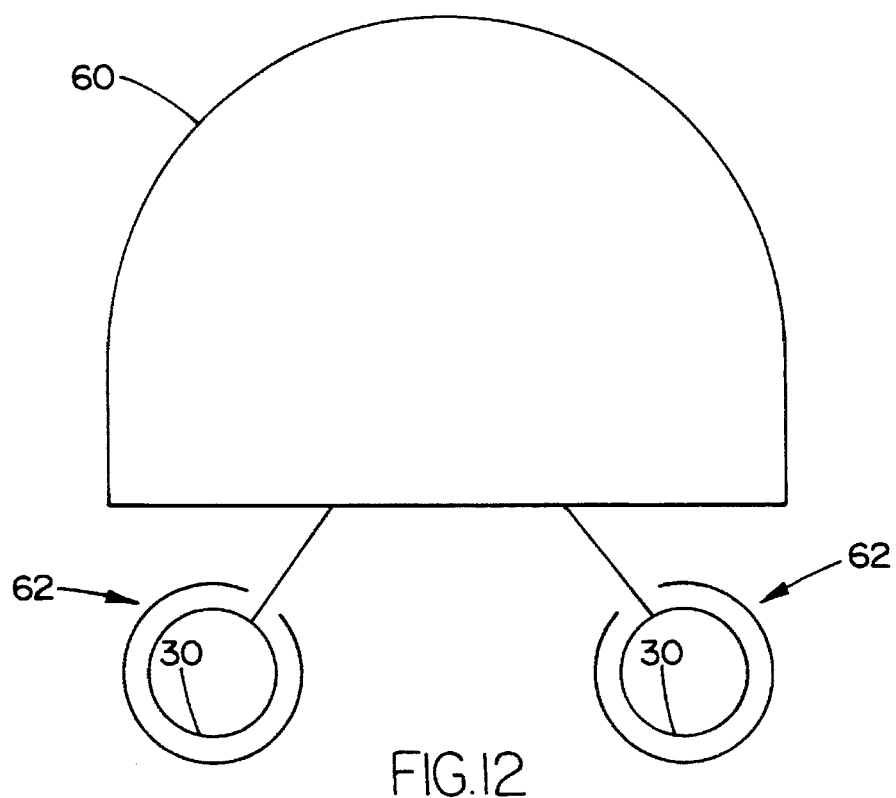

Magnetic support and guidance system 10 may be used in many specific applications. For example, as schematically illustrated in FIGS. 11 and 12, a pair of systems 10 may be used to support a magnetically levitated vehicle 60. More specifically, vehicle 60 is preferably supported for movement along a pair of guideways 62, each guideway comprises a series of quadrupole magnets, and a respective one cylinder 30 is disposed inside each guideway. In practice, the lengths of cylinders 30 and the number of cylinders used to support vehicle 60 may be determined by the lift requirements imposed on the cylinders —that is, by the force needed to levitate vehicle 60. For example, only two cylinders 30, one on each side of vehicle 60, may be sufficient for a very short vehicle. For longer vehicles, four cylinders, two on each side of the vehicle may be employed. For a very long vehicle, many cylinders of predetermined lengths could be employed.

As shown in FIG. 11, cylinders 30 may be connected to vehicle 60, via flanges 32, with the cylinders and flanges arranged in an inverted U-configuration. As shown in FIG. 12, cylinders 30 may be connected to vehicle 60 with the cylinders and flanges arranged in an inverted V-configuration. Both of the support configurations shown in FIGS. 11 and 12 provide stabilization to vehicle 60 in all directions, includes vertical, lateral, yaw, and roll.

Figure 13:
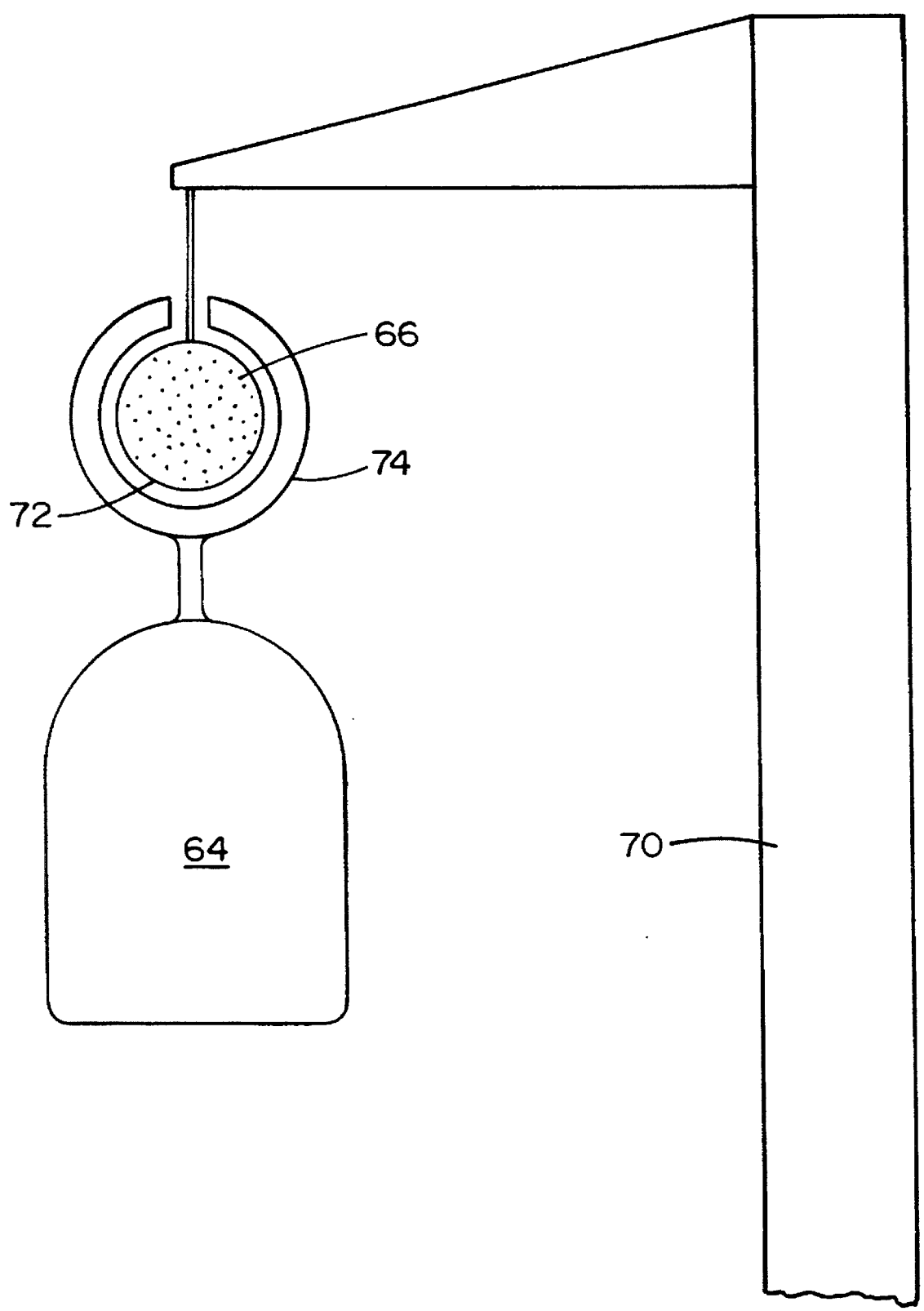
FIG. 13 shows a gondola supported by a magnetic system.

As schematically shown in FIG. 13, magnetic support and guidance system 10 may also be used to support gondola 64 from steel ropes 66 bridging large spans across, for example, rivers or mountains. More particularly, FIG. 13 shows support tower 70 and support cylinder 72 suspended from that tower. A generally cylindrical shaped quadrupole magnet 74 extends around and is magnetically supported by cylinder 72, and gondola 64 is connected to and supported by quadrupole 74. Suspension rope 66 extends through cylinder 72; and additional cylinders may be mounted on and supported by rope 66, between neighboring support towers.

As generally illustrated in FIG. 14, support system 10 may also be employed to support moving sidewalks 76, which are commonly used at airports. More specifically, FIG. 14 shows a moving sidewalk 76 connected to two support cylinders 30, and a linear motor 80 disposed between the support cylinders to move the sidewalk. As sidewalk 76 moves, cylinders 30 levitate the sidewalk and guide movement thereof.

When a moving platform is supported by two support cylinders 30, as illustrated in FIG. 14, the cylinders automatically work together to control rolling movement of the cylinders, and it is not necessary to provide the cylinders with additional roll control means. A moving platform may be supported by one support cylinder —or one series of aligned support cylinders—in which case it may be desirable to provide the support cylinders with roll control means, as for example, shown in FIG. 5.

For a moving sidewalk including one or more support systems, it is not necessary for the sidewalk to have an unused return path. For instance, as illustrated in FIG. 15, both forward and return paths, referenced at 82 and 84 respectively, may be part of the same magnetic levitation system.

As will be understood by those of ordinary skill in the art, the above-discussed techniques for supporting moving sidewalks may also be used with conveyors and escalators, and such escalators may have up and down sections that are connected together to form a closed loop. Also, in all of these instances, the reaction cylinders may be constructed in separate or relatively moveable segments.

Figure 16:
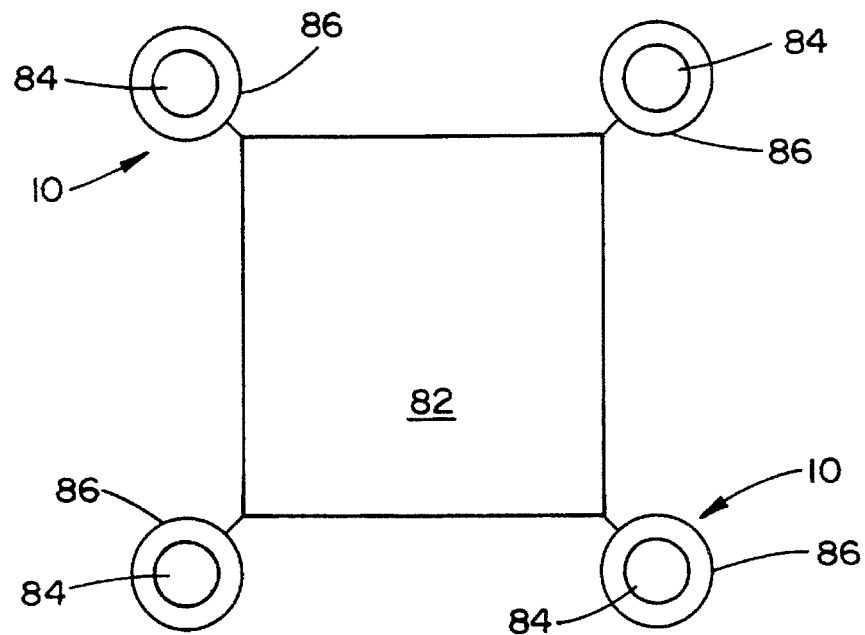
FIG. 16 schematically illustrates an elevator employing a magnetic guidance system.

Elevators may also be laterally stabilized using system 10, as generally illustrated in FIG. 16. More specifically, FIG. 16 shows elevator 82 and four support rods 84. Support rods are used as reaction cylinders, and four quadrupole magnets 86 are connected to the elevator and mounted around the support rods to guide and stabilize movement of the elevator.

Figure 17:
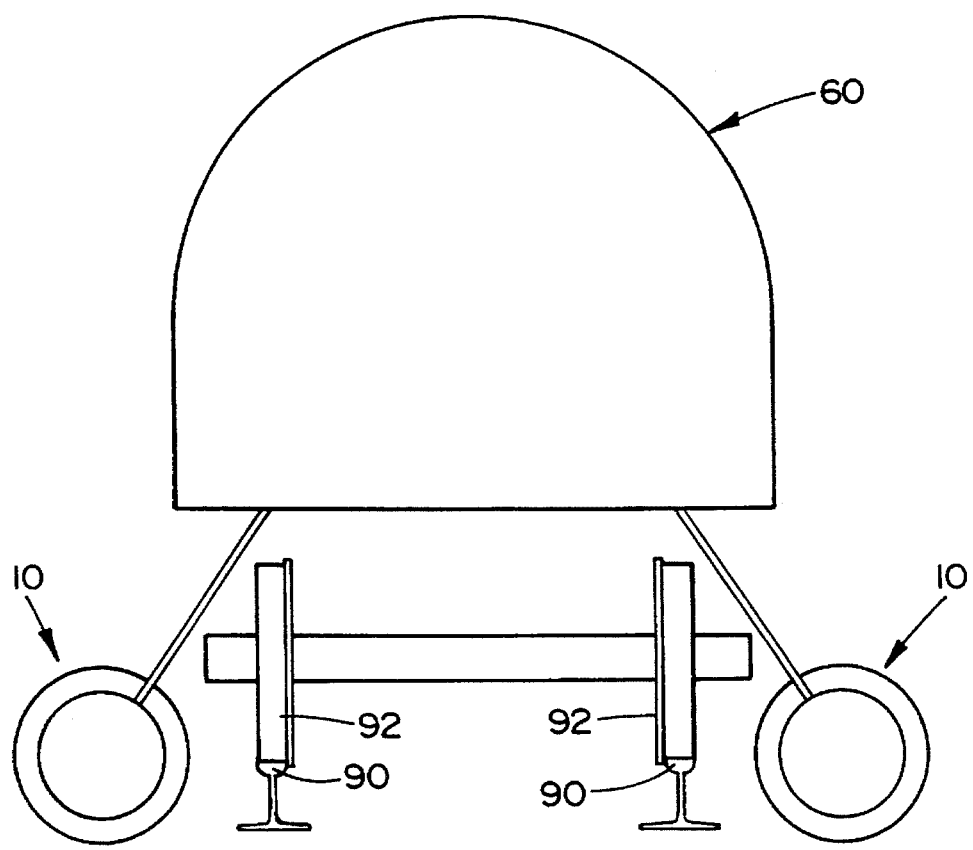
FIG. 17 shows a vehicle supported by a magnetic system and conventional railroad wheels.

With reference to FIG. 17, magnetic system 10 may be employed along existing railroad tracks 90. As shown in FIG. 17, vehicle 60 includes two support systems: conventional railroad wheels 92 mounted on railroad tracks 90; and a pair of magnetic suspension systems 10 connected to vehicle 60 in an inverted V-configuration. At low speeds, vehicle 60 may be supported by rails 90, while at higher speeds, the suspension system 10 may be used to levitate the vehicle above tracks 90.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A magnetic guidance and support system comprising:
an axially extending iron core member including an interior surface forming an interior, and forming an opening in communication with said interior;
a central member including
i) an electrically conductive cylinder positioned in the interior of the core member, and
ii) connecting means connected to the cylinder and extending outward therefrom and through the opening in the core member;
a multitude of electrical conductors axially extending along and annularly spaced around the core member; and
an electric power supply connected to the electrical conductors to conduct an electric current through said conductors, wherein the electrical conductors produce a magnetic quadrupole having a magnetic field to produce a repulsive magnetic force on the cylinder for supporting the cylinder in the interior of the core member and spaced from the interior surface thereof.

2. A system according to claim 1, wherein:
the central member further includes
iii) a first set of cylinder conductors positioned on a first side of the cylinder, and
iv) a second set of cylinder conductors positioned on a second side of the cylinder; and
the system further includes a further electric power supply connected to the first and second sets of cylinder conductors to conduct a current through said first and second sets of cylinder conductors, the current conducted through the first and second sets of cylinder conductors generating an electromagnetic field that interacts with the magnetic field to produce forces resisting rotation of the cylinder.

3. A system according to claim 2, wherein the further electric power supply conducts a three-phase alternating current through the first and second sets of cylinder conductors.

4. A system according to claim 1, wherein the multitude of conductors includes first, second, third, and fourth sets of conductors generally equally spaced apart around the core member.

5. A system according to claim 1, wherein:
the connecting means includes a flange connected to the cylinder and extending outward therefrom, generally perpendicular to the magnetic field; and
the magnetic field applies a force to the flange resisting rotation of the cylinder.

6. A system according to claim 1, wherein:
said magnetic force includes a set of force components;
each of said set of force components acts on a respective side of the cylinder; and
each of said set of force components has a magnitude that increases as the distance between the respective side of the cylinder and the interior surface of the core member decreases;
whereby said magnetic force supports the cylinder in a radially stable equilibrium inside the core member.

7. A magnetic guidance and support system comprising:
an elongated guideway including
a multitude of axially extending iron core members, each of the core members including an interior surface forming an interior, and forming an opening in communication with said interior, the core members being positioned in series with the interiors of the core members forming a guide path and with the openings of the core members forming an inlet to said guide path;
a central member including
i) an electrically conductive cylinder positioned in the guide path, and
ii) connecting means connected to the cylinder and extending outward therefrom and through the inlet to the guide path;
a multitude of electric conductors axially extending along and annularly spaced around the guideway; and
an electric power supply conducted to the electrical conductors to conduct an electric current through said conductors, wherein the electric conductors produce a magnetic quadrupole having a magnetic field to produce a repulsive magnetic force on the cylinder for supporting the cylinder in the interiors of the core members and spaced from the interior surfaces thereof.

8. A system according to claim 7, further comprising means to move the cylinder along the guideway.

9. A system according to claim 8, wherein:
the core members are spaced apart along the guideway; and
the means to move the cylinder includes
i) a multitude of traction windings located between the core members, and
ii) a further electric power supply connected to the traction windings to conduct an electric current through the traction windings, wherein the traction windings produce an electromagnetic field to move the cylinder along the guideway.

10. A system according to claim 9, wherein:

the guideway includes an additional iron member extending along and between the core members; and the traction windings are supported by the additional iron member.

11. A system according to claim 7, wherein:

the cylinder defines an axis;

the central member further includes iii) a first set of cylinder conductors located on a first side of the cylinder, and iv) a second set of cylinder conductors located on a second side of the cylinder; and the system further includes a further electric power supply connected to the first and second sets of cylinder conductors to conduct a current through said first and second sets of cylinder conductors, the current conducted through the cylinder conductors generating an electromagnetic field that interacts with the magnetic field to produce forces resisting rotation of the cylinder about the axis thereof.

12. A system according to claim 7, wherein:

the cylinder defines an axis;

the connecting means includes a flange connected to the cylinder and extending outward therefrom, generally perpendicular to the magnetic field; and the magnetic field applies a force to the flange resisting rotation of the cylinder about the axis thereof.

13. A system according to claim 7, wherein:

said magnetic force includes a set of force components;

each of said set of force components acts on a respective side of the cylinder; and each of said set of force components has a magnitude that increases as the distance between the respective side of the cylinder and the interior surfaces of the core members decreases;

whereby said magnetic force supports the cylinder in a radially stable equilibrium inside the core member.

14. A method of supporting a cylinder inside an iron core member including an interior surface forming an interior, the method comprising:

moving the cylinder through the interior of the core member;

generating a magnetic quadrupole having a magnetic field extending across the interior of the core member; and said magnetic field producing a repulsive magnetic force on the cylinder, said force supporting the cylinder in said interior and spaced from the interior surface of the core member.

15. A method according to claim 14, wherein the generating step includes the steps of:

conducting first and second electric currents along the core member in a first direction; and conducting third and fourth electric currents along the core member in a second direction, opposite the first direction.

16. A method according to claim 15, wherein the steps of conducting the first, second, third, and fourth currents includes the steps of conducting said first, second, third, and fourth currents along first, second, third, and fourth electric conductors uniformly spaced apart around the core member.

17. A method according to claim 14, further including the step of resisting rotation of the cylinder inside the core member.

18. A method according to claim 17, wherein the resisting step includes the step of generating an electromagnetic field from the cylinder, said electromagnetic field reacting with the magnetic field to resist rotation of the cylinder inside the core member.

19. A method according to claim 18, wherein the step of generating the electromagnetic field includes the steps of conducting a first current along a first side of the cylinder, and conducting a second current along a second side of the cylinder.

20. A method according to claim 14, wherein the producing step includes the step of:

producing a magnetic force including a set of force components; and each of said force components acting on a respective side of the cylinder;

each of said force components having a magnitude that increases as the distance between the respective side of the cylinder and the interior of surface of the core member decreases, whereby said magnetic force supports the cylinder in a radially stable equilibrium inside the core member.

* * * * *